United States Patent [19]

Wignot et al.

[11] Patent Number: 5,142,370
[45] Date of Patent: Aug. 25, 1992

[54] INTERRUPTING THE VIDEO IF SIGNAL PATH DURING FM RADIO MODE IN A TELEVISION RECEIVER

[75] Inventors: Leroy S. Wignot; Dal F. Griepentrog, both of Indianapolis, Ind.

[73] Assignee: Thomson Consumer Electronics, Inc., Indianapolis, Ind.

[21] Appl. No.: 571,857

[22] Filed: Aug. 23, 1990

[51] Int. Cl.$^5$ .............................................. H04N 5/50
[52] U.S. Cl. ................................ 358/191.1; 358/189; 358/196; 358/198; 455/189.1; 455/315
[58] Field of Search .................. 358/191.1, 189, 193.1, 358/188, 196, 198, 197, 195.1; 455/168, 188, 190, 191, 197, 179, 184, 314, 315, 339, 189, 180, 176, 154; 333/175, 167, 184, 185

[56] References Cited

U.S. PATENT DOCUMENTS

| | | | |
|---|---|---|---|
| 2,650,265 | 8/1953 | Mountjoy | 455/143 |
| 4,272,788 | 6/1981 | Ogita | 358/189 |
| 4,490,743 | 12/1984 | Mycynek | 358/198 |
| 4,499,602 | 2/1985 | Hermeling | 455/189 |
| 4,553,264 | 11/1985 | Hasegawa | 455/189 |
| 4,581,643 | 4/1986 | Carlson | 455/315 |
| 4,709,407 | 11/1987 | Baba | 455/315 |
| 4,726,072 | 2/1988 | Yamashita | 455/189 |
| 4,814,874 | 3/1989 | Adachi | 358/140 |
| 4,970,087 | 11/1990 | Rumreich | 358/198 |

OTHER PUBLICATIONS

Page 2-1 of RCA/GE Color Television Service Data CTC156/157.
Page 2-3 of RCA/GE Color Television Supplemental Service Data CTC156/157-S1.
Article entitled TV Mulitchannel Sound-The BTSC System, by C. G. Eilers, published in IEEE Transactions on Consumer Electronics, Feb. 1985.

Primary Examiner—James J. Groody
Assistant Examiner—Sherrie Hsia
Attorney, Agent, or Firm—Joseph S. Tripoli; Peter M. Emanuel; Thomas F. Lenihan

[57] ABSTRACT

A television receiver includes a single tuner for tuning both television channels and broadcast FM stations. The tuner serves as the first conversion stage of a double conversion FM receiver, wherein the mixer of an FM radio integrated circuit serves as the second conversion stage. The receiver provides an on-screen display of the currently tuned FM channel number. Circuitry is provided for interrupting the path of signals from the tuner to the IF amplifier stage of the television receiver when the receiver is in FM radio signal reception mode, to prevent the FM radio signals from adversely affecting the television synchronizing signals during the display of the FM channel number.

5 Claims, 4 Drawing Sheets

INTERRUPTING THE VIDEO IF SIGNAL PATH DURING FM RADIO MODE IN A TELEVISION RECEIVER

CROSS REFERENCE TO RELATED APPLICATIONS

U.S. patent applications bearing Ser. Nos. 561,583 561,584 561,585 561,586 561,587 561,588 and 561,589, filed Aug. 6, 1990, and assigned to the same assignee as the subject application, contain related subject matter.

FIELD OF THE INVENTION

The subject application concerns the field of television receivers including an FM radio.

BACKGROUND OF THE INVENTION

In the United States, the broadcast FM radio band occupies a band of frequencies extending from approximately 88 MHz to approximately 108 MHz. This band of frequencies lies between the frequencies allocated for broadcast television channel 6 and television cable channel 98. In addition, the National Weather Service broadcasts FM radio signals in a band of frequencies near 162.5 Mhz. Single-tuner multiband radio receivers having the capability to receive AM, broadcast FM, and National Weather Service radio signals, and television sound signals, are known from, for example, the Windsor Radio, model number 2239, FCC ID number BGK91F2239, manufactured in Hong Kong.

Television receivers having the capability to receive broadcast FM signals are known from the prior art. The Dumont model RA-119A television receiver, manufactured by Allen B. Dumont Laboratories, Passaic, N.J., is an example of a class of television receivers having a single tuner for receiving both television signals and broadcast FM radio signals. This single-tuner class of television receivers was manufactured during the years 1949 to 1952 inclusive, and utilized a continuous tuning arrangement for tuning signals having frequencies between 44 MHz and 217 MHz. This class of television receivers employed a so-called split sound IF system, that is, a separate sound IF channel tuned to 41.25 Mhz. The sound signals for both television and FM radio were demodulated directly from signals at the television sound IF frequency of 41.25 MHz.

Modern television receivers have abandoned the split-sound IF system in favor of the intercarrier sound system, which is less complex, less costly, and more reliable. The intercarrier-sound IF system takes advantage of the fact that the picture and sound carriers are held to close tolerances at the transmitter, ensuring that they are always separated by a constant 4.5 MHz. In an intercarrier-sound IF system, the sound IF signals are amplified along with the picture IF signals in a single IF amplifier. After amplification, the sound signals are converted to a 4.5 MHz intercarrier sound IF frequency by "beating" (i.e., heterodyning) the sound IF signals at 41.25 MHz against a signal at the picture carrier frequency of 45.75 Mhz. The television sound signals are then demodulated from the resulting 4.5 MHz intercarrier signal.

Modern intercarrier-sound type television receivers cannot recover and reproduce broadcast FM radio sound signals, because FM radio signals lack a signal at the picture carrier frequency required by the television receiver circuitry for use in recovering the sound signal. Therefore, as a result of adopting the intercarrier sound system, television manufacturers wanting to provide the capability of receiving broadcast FM radio signals, chose to add a separate FM radio having its own tuner. This may also have been done because modern television tuners commonly include tuned circuits (FM traps) for trapping out FM signals which may otherwise interfere with television video signal reception.

A typical FM trap for a television receiver is a tuned circuit exhibiting an amplitude vs. frequency characteristic having a single deep notch substantially centered on the FM band of frequencies, and sufficiently wide to attenuate FM signals throughout the FM band of frequencies. Not surprisingly, removing the FM trap degrades the video signal reproduction performance of the receiver when tuning television signals. This is deemed unacceptable because the receiver is primarily a television receiver, and only additionally an FM radio receiver.

Copending U.S. patent application Ser. No. 561,587 (Lehmann), discloses an FM trap for a television receiver which permits tuning of both television and FM radio signals by a single television tuner. The amplitude vs. frequency characteristic of the FM trap of Lehmann exhibits steep skirts (i.e., sharp rolloff) and a substantially flat band rejection region over substantially all of the FM broadcast band. As a result, the normally strong FM radio signals are attenuated uniformly over substantially the entire FM band. In addition to the uniform attenuation provided by the FM trap, a fixed gain control signal operates the television tuner at a lower gain setting when in FM reception mode, as disclosed in copending U.S. patent application Ser. No. 561,583 (Lehmann et al.).

Copending U.S. patent application Ser. No. 561,588 (Wignot et al.) discloses a television receiver in which during FM reception mode, the television receiver produces a video signal which when displayed identifies the FM station to which the receiver is currently tuned. Although the received FM radio signals are attenuated in the above-described trap, and amplified by the television tuner in a lower gain mode of operation, they nevertheless were found to be of a sufficient magnitude so as to adversely affect the synchronization of the display of the FM radio station identification message.

SUMMARY OF THE INVENTION

In a television receiver having a single tuner employed for tuning television signals in at least one band of television frequencies, and broadcast FM radio signals in an FM band of frequencies adjacent to the television band of frequencies, circuitry for coupling to the output of the television tuner to the television IF amplifier is disabled in order to decouple FM signals which might otherwise be applied to the television IF processing circuitry, thus preventing erratic synchronizing signals from being generated during FM reception mode of operation.

DETAILED DESCRIPTION OF THE EMBODIMENT

Figure 1:
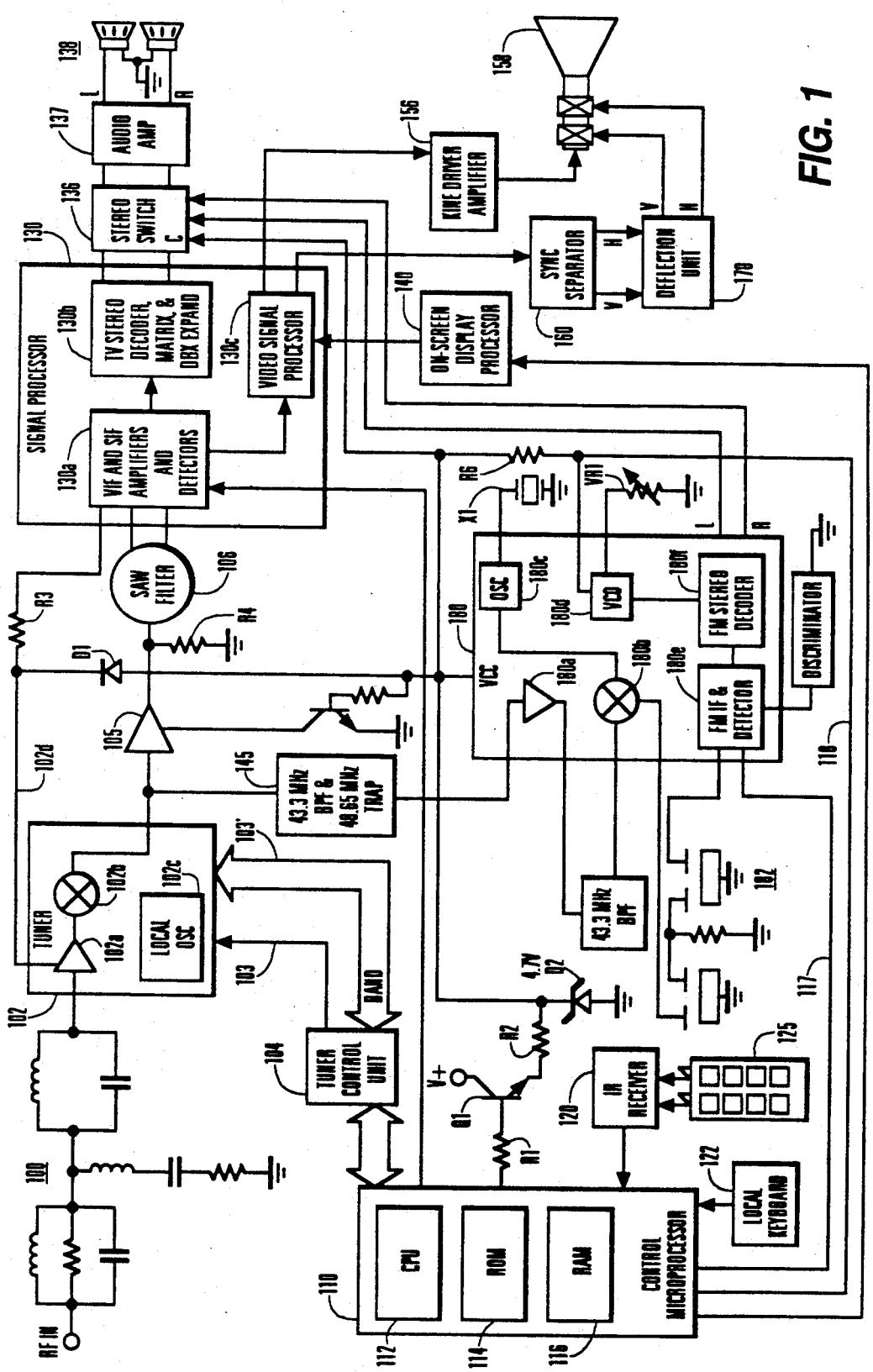
FIG. 1 shows, in block diagram form, a television receiver incorporating the subject invention.

Referring to FIG. 1, television radio frequency (RF) and broadcast FM radio frequency signals are applied an to RF input terminal of an FM trap circuit generally designated 100. FM trap 100 will be described in detail below with respect to FIG. 3. RF signals appearing at the output of FM trap 100 are applied to a tuner 102. Tuner 102 includes an RF amplifier 102a for amplifying RF signals, and applying the amplified RF signals to one input of a mixer 102b. Tuner 102 also includes a local oscillator 102c for generating a local oscillator signal which when applied to a second input of mixer 102b heterodynes with the amplified RF signal and produces an output signal at the television intermediate frequency (IF frequency). Tuner 102 selects a particular RF signal under control of a tuner control unit 104. Alternatively, tuner control unit 104 may also be included within tuner 102. Tuner control unit 104 applies a tuning control signal to tuner 102 via a wire 103, and applies bandswitching signals via a control bus 103'. The tuning control signal and bandswitching signals control the frequency at which local oscillator 102c oscillates, thus determining which RF signal is converted (heterodyned) to the IF frequency. Tuner control unit 104 is controlled by a controller 110. Controller 110, which may be a microprocessor or microcomputer, includes a central processing unit (CPU) 112, a read-only memory (ROM) 114, and a random access memory 116. Controller 110 receives user-entered control signals from a local keyboard 122, and from an infrared (IR) receiver 120. IR receiver 120 receives and decodes remote control signals transmitted by a remote control unit 125.

The intermediate frequency (IF) signal produced by tuner 102 is applied to a surface acoustic wave (SAW) filter preamplifier 105 which amplifies the IF signal and applies it, via SAW filter 106 to a so-called "one-chip" signal processing unit 130. Signal processing unit 130 includes a video IF (VIF) and sound IF (SIF) signal processor unit 130a, an audio signal processor unit 130b, and video signal processor 130c. VIF/SIF signal processing unit 130a comprises a video IF (VIF) amplifying stage, an automatic gain control circuit (AGC), an automatic fine tuning circuit (AFT), a video detector, and a sound IF (SIF) amplifying stage. VIF/SIF processing unit 130a produces a baseband composite video signal (TV), and a sound carrier signal. The sound carrier signal is applied to an audio signal processor unit 130b which includes a TV stereo decoder, a matrix, and a DBX expander. Audio signal processor unit 130b produces left and right audio signals and applies them to one pair of inputs of an audio switch unit 136. The output of audio switch unit 136 is coupled to an audio amplifier unit 137. Audio amplifier unit 137 produces amplified baseband left and right audio signals and applies them to a pair of speakers 138 for sound reproduction.

The baseband video signal (TV) is coupled to video processor unit 130c and a kine driver amplifier 156, and ultimately displayed on a display screen of a display device 158. Video signals from video processor unit 130c are also applied to a sync separator unit 160 which derives vertical and horizontal synchronizing signals therefrom. The derived vertical and horizontal signals are applied to a deflection unit 170 for the production of deflection signals for application to the yoke assembly of display device 158. Under control of controller 110, an on-screen display processor 140 generates character signals, and applies them to a second input of video signal processor 130c, for display on display device 158. The circuitry described thus far, with the exception of the particular FM trap shown in FIG. 1, is known from the RCA CTC 156 color television chassis, manufactured by Thomson Consumer Electronics, Inc., Indianapolis, Ind.

The intermediate frequency (IF) signal produced by tuner 102 is also applied, via a 43.3 Mhz bandpass filter and 48.65 MHz trap arrangement 145, to a single chip FM radio integrated circuit (IC)180. FM radio IC 180 is, for example, a CXA12338M/S AM/FM Stereo Radio Circuit manufactured by SONY Corporation. FM radio IC 180 includes an amplifier 180a, a mixer 180b, an oscillator 180c, a voltage controlled oscillator (VCO) 180d, an FM IF and detector unit 180e, and an FM stereo decoder unit 180f.

Television tuner 102 is used as the first frequency conversion stage of a double conversion tuner for the FM broadcast band, wherein the second frequency conversion stage of the double conversion tuner is provided by FM radio IC 180. That is, a particular FM radio signal is selected and converted in frequency from one of the FM radio band of frequencies, to a first intermediate frequency of 43.3 MHz. The value 43.3 MHz is important and its selection is discussed in detail in co-pending U.S. patent application Ser. No. 561,585 (Grubbs).

The signals at the first FM radio IF frequency are then heterodyned in mixer 180b with the 54.0 MHz oscillator signals produced by fixed frequency crystal-controlled oscillator 180c. It was found that it is desirable to crystal-control oscillator 180c to avoid drifts in frequency due to temperature changes which may occur in and around the area of oscillator 180c. The result of the heterodyning process is an FM radio signal at the nominal FM IF frequency of 10.7 MHz, which is then filtered in a ceramic resonator arrangement, generally designated 182. The second ceramic resonator of ceramic resonator arrangement 182 was added to improve selectivity. Signals at the output of ceramic resonator arrangement 182 are then amplified, detected, and decoded by FM signal processing units 180d, 180e, and 180f, in the normal manner. A potentiometer VR1 is provided for adjustment of the VCO frequency. Decoded left (L) and right (R) stereo signals are applied to a second pair of input terminals of audio switch 136. When the decoded left (L) and right (R) stereo signals are selected by audio switch unit 136, they are applied to audio amplifier 137 for reproduction in speaker arrangement 138. Lines 117 and 118 coupled between FM radio IC 180 and controller 110 convey signals indicative of whether a signal is tuned, and whether a signal is in stereo, respectively.

Tuner 102 is of the frequency synthesis (FS) type, which means that the frequency of the local oscillator can be changed in a series of steps of a given size under control of controller 110. In FM reception mode, controller 110 causes oscillator 102c to change its frequency in 31.5 kilohertz steps. This means that there can be a mistuning of an FM station by a maximum of 31.5 kHz/2, or 15.75 kHz error. This is acceptable because FM radio IC 180 has acceptable demodulation characteristics over a range of approximately +/−110 kHz, and also because the FM broadcast frequencies are spaced 200 kHz apart.

In operation, controller 110 receives a command, via local keyboard 122, or via IR receiver 120, to enter the FM radio mode. In response, controller 110 applies a signal to the base of transistor Q1 via resistor R1. Transistor Q1 switches on and provides a source of supply voltage to a voltage regulator circuit R2, D2 which in turn provides power (VCC) to operate FM radio IC 180. This switched VCC is also applied to the control terminal of stereo switch 136 and causes the selection the FM radio audio signals in FM radio mode. Controller 110 also applies a VIDEO DISABLE control signal to VIF/SIF processing unit 130a via a control line 131. The VIDEO DISABLE control signal sets the IF automatic gain control (IF AGC) to its lowest setting to inhibit the amplification of unwanted signals during FM reception mode.

There are two obstacles to good FM reception performance, poor sensitivity and overload, and a carefully chosen compromise between the two must be utilized. Recall that in the television mode of operation, the RF amplifier is gain controlled by an AGC signal derived in the television video IF (VIF) circuitry. In FM mode, the AGC signals are disconnected from the RF amplifier because no meaningful AGC signals are being produced in the VIF circuitry. If the television tuner were to be operated at maximum gain in FM reception mode, medium to strong level FM signals would overdrive the tuner mixer and RF stages, creating unwanted distortion products. Providing a separate FM AGC arrangement is simply unacceptable due to the cost and complexity which would be added to the television receiver. The solution is to operate the RF stage of the tuner at a fixed gain during FM reception mode. This arrangement has a much lower cost, adding only a few components. The gain reduction must be chosen carefully. Too much gain reduction would produce poor FM reception sensitivity, and too little gain reduction yields an overload situation. A second factor which aids to make operation of the RF stage at a reduced gain function well, is the fact that the noise figure of the gain reduced RF amplifier stage is degraded (becomes higher) at a much slower rate than the rate for gain reduction, thus maintaining a better signal to noise ratio. This permits compensation for the RF amplifier gain reduction to be placed in a subsequent IF postamplifier stage, to maintain overall receiver sensitivity.

Disconnecting of the AGC signals is accomplished by applying the 4.7 volt FM radio switched VCC to AGC line 102d via a diode D1. The FM radio VCC supply is well regulated enough to yield gain reductions which fall within acceptable tolerances. It is important to note that the FM radio IC chosen has a wide range of usable operating voltages. The 4.7 volt level was specifically chosen to fit the needs of the television tuner RF gain reduction bias. A resistor R3 isolates the AGC circuitry from the applied VCC. The amplitude of the switched VCC after passing through diode D1 is approximately 4 volts. Applying a fixed 4 volt signal to the AGC control terminal of RF amplifier 102a causes it to operate in a lower gain mode.

Figure 4:
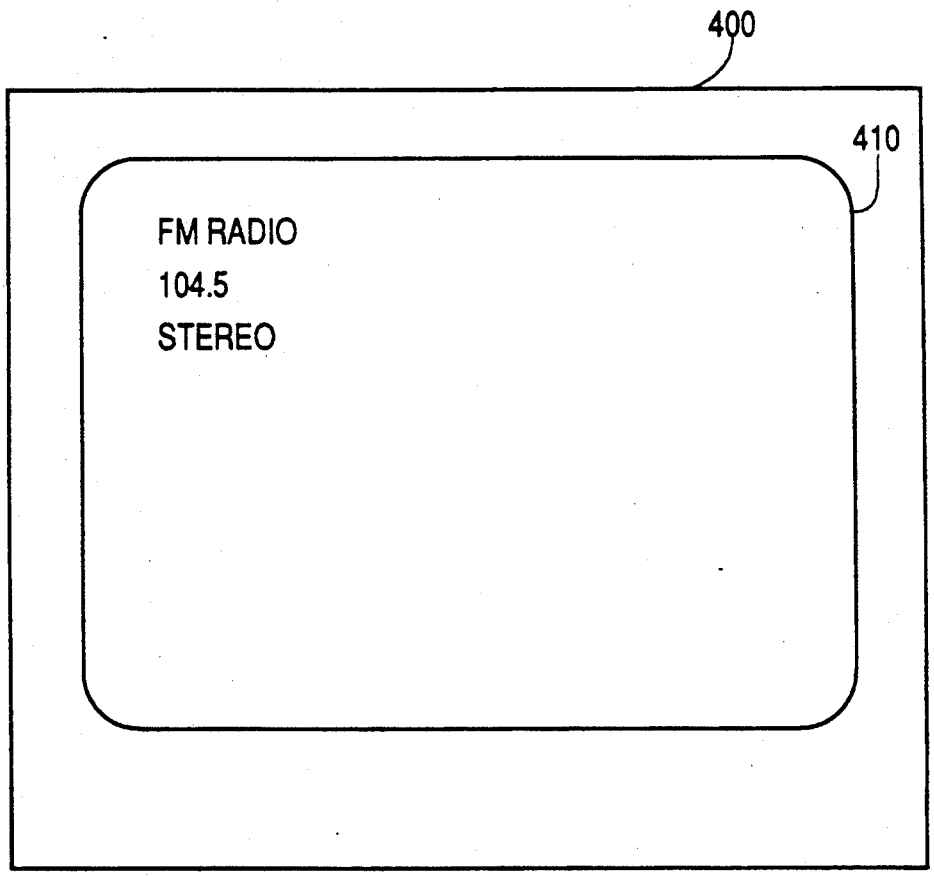
FIG. 4 is an illustration showing a display screen providing FM station information in FM radio signal reception mode.

During FM reception mode no television images are available for viewing. Accordingly, as explained in copending U.S. patent application Ser. No. 561,588, when an FM station is selected, controller 110 causes on-screen display processor 140 to display a message indicating to a user that the television receiver is in FM mode, that a particular FM station has been selected and whether or not the received FM signal is in stereo. The display, shown in FIG. 4 on a display screen 410 of a television receiver 400, is presented to the user for a predetermined period of time (perhaps 30 seconds), after which there is displayed a blank screen. Synchronizing signals for this display are generated by a free-running oscillator included within video signal processor 130c, as known in the prior art.

In FM reception mode, the signal level desired at the tap leading to the input of 43.3 MHz bandpass filter and 48.65 MHz trap unit 145, is approximately 0 dBm (i.e., approximately 0.6 volts peak-to-peak). This FM signal level is achieved by attenuation of the usually strong FM signals in FM trap 100, and by operating tuner 102 a fixed lower value gain control voltage. The FM signal also appears at the input of SAW filter preamplifier 105. SAW filter preamplifier 105 typically has a voltage gain of approximately 26 dB (i.e., a gain of 20). Thus, the output signal of SAW filter preamplifier 105 shall be equal to 0.6×20, or 12 volts peak-to-peak. However, the actual amplitude of the signal at the output of SAW filter preamplifier 105 is about 3 volts peak-to-peak due to gain compression in its small signal transistor at high frequencies. Nonetheless, a 3 volt peak-to-peak signal is a very large signal when applied via SAW filter to the input "one-chip" signal processor unit 130. Because no video signals are being received in FM mode, the IF AGC control voltage is removed to reduce the IF gain to its minimum operating condition. However, it was found that, due to the large input signal amplitude, removing the IF AGC did not prevent FM radio signals from being erroneously interpreted in VIF/SIF a processing unit 130a as incoming video signals. These unwanted signals are applied via video signal processor 130c to sync separator 160, and cause sync separator 160 to generate erratic synchronizing signals. The erratic synchronizing signals, in turn, cause the on-screen display of the FM radio station identification message to be unstable.

It should be noted that it is not possible to disconnect the output of the video IF amplifier (VIF/SIF unit 130a) from the input of video signal processor unit 130c, because those units are included within one-chip signal processor 130, which does not provide external access to that portion of its circuitry. The solution to the above-described problem is to prevent the unwanted signals from reaching the input of "one-chip" signal processor 130 by disabling SAW filter preamplifier 105. The disabling of preamplifier 105 is accomplished by applying the switched FM radio VCC, via a base resistor R7, to a transistor Q2 which in turn applies a control signal to a control input of SAW filter preamplifier 105. Disabled preamplifier 105 attenuates unwanted FM radio signals at the input of signal processing unit 130.

Figure 2:
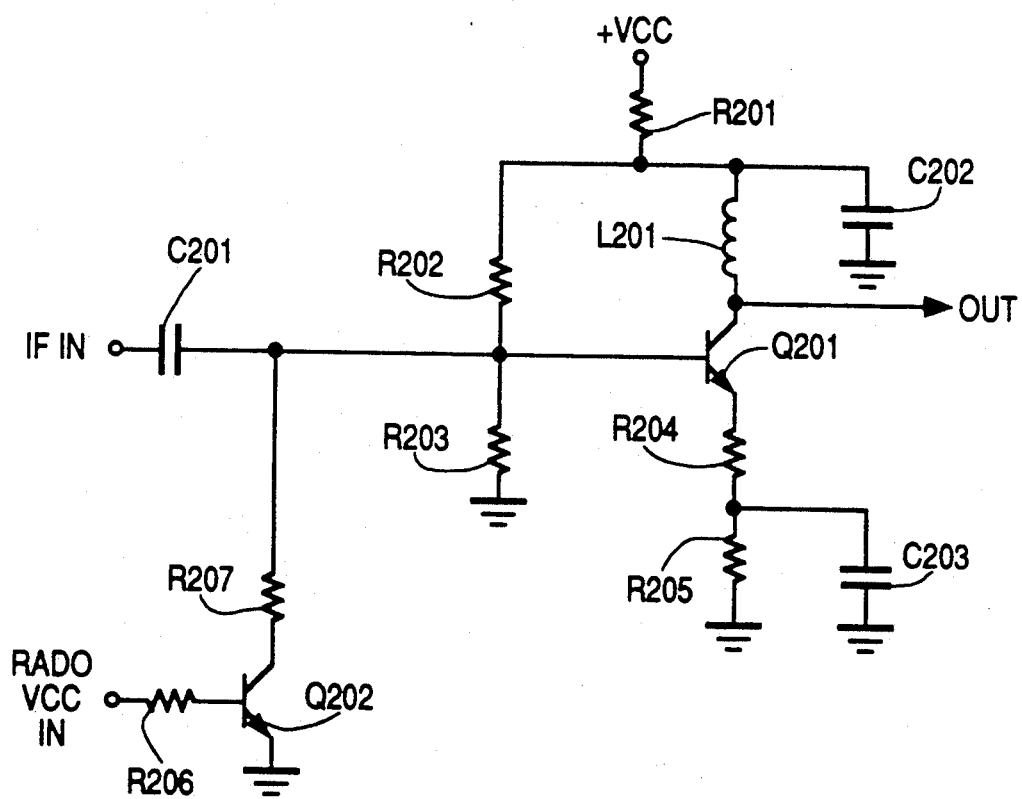
FIG. 2 shows a detailed schematic representation of the SAW filter amplifier of FIG. 1, in accordance with one embodiment of the invention.

Referring to FIG. 2, a SAW filter preamplifier comprises a transistor Q201 having base bias resistors R202 and R203, an inductive load L201 in its collector circuit, and a series coupled pair of resistors R204 and R205 in its emitter circuit. Resistor R205 is AC bypassed by a capacitor C205 connected in parallel. The supply voltage VCC is applied to the amplifier via a decoupling network comprising R201 and C202. The input signal is applied to the amplifier via a coupling capacitor C201, and the output is taken from its collector circuit. During television signal reception mode, transistor Q301 is active and its gain is approximately equal to its collector impedance divided by its unbypassed emitter impedance, or $(2\pi \times 45.75 \text{ MHz} \times 0.68 \text{ microhenries}) \div 10$ ohms = 19.5. This is a reasonably close approximation of the actual preamplifier gain of 20 (i.e., 26 dB gain).

A "disabling" transistor Q202 corresponds to transistor Q2 of FIG. 1, and its base bias resistor R206 corresponds to resistor R7 of FIG. 1. Collector resistor R207 is in shunt with the FM radio signal path, and must be large enough so that does not excessively attenuate the desired FM signal at the input of bandpass filter unit 145. At the same time, the value of resistor R207 must be low enough to attenuate the FM radio signal applied to transistor Q201 of the SAW filter preamplifier. Suitable component values for the arrangement of FIG. 2 are listed in the following table.

R201: 100 ohms
R202: 1500 ohms
R203: 390 ohms
R204: 10 ohms
R205: 68 ohms
R206: 10000 ohms
R207: 33 ohms
C201: 1000 picofarads
C202: 1000 picofarads
C203: 1000 picofarads
L201: 0.68 microhenries In operation, FM radio VCC is applied to the base of Q202 via resistor R206 during FM radio reception mode, causing Q202 to saturate. Turning on transistor Q202 has two effects on the preamplifier. First, the base bias developed by resistor network R202 and R203 is decreased, because the combined impedance of saturated transistor Q202 and the 33 ohm resistance of resistor R207 is in parallel with resistor R203. Second, FM radio signals at the junction of C201 and R207 "see" a low impedance to ground (i.e., the combined impedance of saturated transistor Q202 and the 33 ohm resistance of resistor R207 in series). The above-described low impedance path to ground shunts enough of the FM radio signal to ground to prevent the above-noted erratic synchronization problems.

Figure 3:
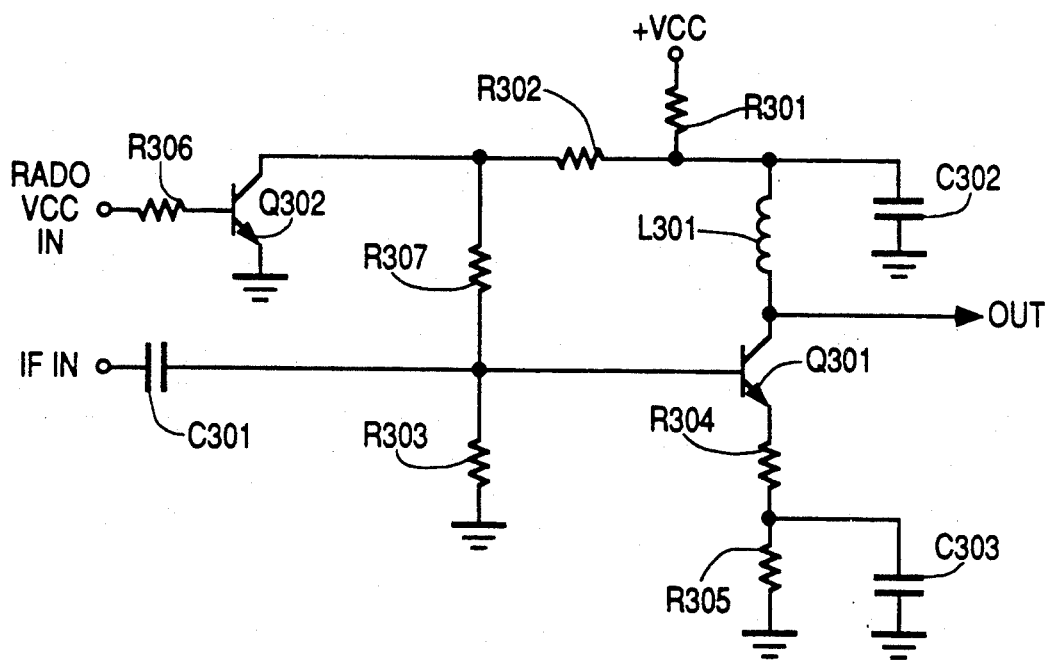
FIG. 3 shows a detailed schematic representation of the SAW filter amplifier of FIG. 1, in accordance with a preferred embodiment of the invention.

However, it was felt that the performance of the circuit of FIG. 2 was marginal due to the above-mentioned constraints on the value of R207. A preferred embodiment of the invention is illustrated in FIG. 3, wherein elements bearing similar reference numerals to those of FIG. 2 serve a similar purpose. Note that the "disabling" transistor circuit comprising elements Q302, R306 and R307 has been relocated from its former position in FIG. 2. In operation, FM radio VCC is applied, via base resistor R306, to the base of transistor Q302, and causes transistor Q303 to saturate. Turning on transistor Q302 has two effects on the preamplifier. First, the base bias developed by resistor network R302, R307 and R303 is decreased, because the low impedance of saturated transistor Q302 is in parallel with the series combination of resistor R307 and resistor R303. This arrangement essentially removes the base bias from transistor Q301, thus ensuring that the preamplifier is turned off. Second, FM radio signals at the junction of C301 and R307 "see" a low impedance to ground (i.e., the combined impedance of saturated transistor Q302 and the 51 ohm resistance of resistor R307 in series). The above-described low impedance path to ground shunts enough of the FM radio signal to ground to prevent the above-noted erratic synchronization problems. This arrangement also allows the value of resistor R307 to be adjusted as needed to obtain a desired FM radio signal level at the input of bandpass filter 145.

The arrangement of FIG. 3 also provides substantially the same input impedance, as "seen" from the output of tuner 102, in both television signal reception mode and FM radio signal reception mode. This is explained as follows. Assuming an hfe (i.e., the short-circuit forward current gain in common-emitter configuration) of approximately 5.75 (at 45.75 MHz), the input impedance of transistor 301 is approximately 57.5 ohms. Thus, the amplifier input impedance is 57.5 ohms in parallel with 390 ohm resistor R303, or approximately 50 ohms, during the television signal reception mode.

During FM radio signal reception mode, transistor Q302 is turned on, and transistor Q301 is turned off and assumes a high impedance state. The input impedance of the arrangement of FIG. 3 then becomes the parallel combination of resistor R307 (51 ohms) and resistor R303 (390 ohms), or about 45.1 ohms, which is, for practical purposes, substantially the same as the input impedance during television signal reception mode. Suitable component values for the elements of FIG. 3 are listed in the following table.

R301: 100 ohms
R302: 1500 ohms
R303: 390 ohms
R304: 10 ohms
R305: 68 ohms
R306: 10000 ohms
R307: 51 ohms
C301: 1000 picofarads
C302: 1000 picofarads
C303: 1000 picofarads
L301: 0.68 microhenries It is herein specifically recognized that the subject invention is also useful in videocassette recorders (VCRs). The term television receiver, as used herein, includes television receivers having a display device (commonly known as television sets) and television receivers without a display device, such as VCRs.

What is claimed is:
1. A television receiver, comprising:
   tuner means for operating in a first mode for receiving television RF signals, said tuner means selecting a particular television RF signal from a plurality of television RF signals in response to a first control signal, converting the frequency of said selected signal to an intermediate frequency and developing said selected intermediate frequency signal at an output;
   intermediate frequency (IF) amplifier means for amplifying said selected intermediate frequency signal;
   coupling means for coupling said selected intermediate frequency signal at said output of said tuner means to said intermediate frequency amplifier means in response to a first state of a second control signal;
   said tuner means also operating in a second mode as a first frequency conversion stage for a double conversion broadcast FM radio signal receiver, for receiving broadcast FM radio RF signals, said tuner means selecting a particular broadcast FM radio RF signal from a plurality of broadcast FM radio RF signals in response to said first control signal, and for converting said particular broadcast

FM radio RF signal to a first intermediate frequency;

control means for generating said first control signal for causing said tuner means to select one of said particular television RF signal and said particular broadcast FM radio RF signal;

a second frequency conversion stage of said double conversion broadcast FM radio signal receiver, said second frequency conversion stage receiving said broadcast FM radio signal at said first intermediate frequency and conveting said broadcast FM radio signal at said first intermediate frequency to a second intermediate frequency; and means for demodulating audio signals from said signal at said second intermediate frequency;

said control means generating a second state of said second control signal for causing said tuner means to switch between said first and second modes of operation, and for causing said coupling means to decouple said signal at said output of said tuner means from said intermediate frequency amplifier means.

2. The television receiver of claim 1 wherein said coupling means is a SAW filter preamplifier, and said SAW filter preamplifier includes means for disabling said SAW filter preamplifier in response to said second state of said second control signal.

3. The television receiver of claim 2 wherein said coupling means exhibits an input impedance and said input impedance of said coupling means is substantially the same in both said first and said second modes of operation.

4. The television receiver of claim 2 wherein said means for disabling said SAW filter preamplifier comprises a first transistor having a main current path coupled between the input of said SAW filter preamplifier and a point of reference potential for attenuating said output signal of said tuner means at said input of said SAW filter preamplifier.

5. A television receiver, comprising:

tuner means for operating in a first mode for receiving televsion RF signals, said tuner means selecting a particular television RF signal from a plurality of television RF signals in response to a first control signal, converting the frequency of said selected signal to an intermediate frequency and developing said selected intermediate frequency signal at an output;

intermediate frequency (IF) amplifier means for amplifying said selected intermediate frequency signal;

coupling means for coupling said selected intermediate frequency signal at said output of said tuner means to said intermediate frequency amplifier means in response to a first state of a second control signal;

said tuner means also operating in a second mode as a first frequency conversion stage for a double conversion broadcast FM radio signal receiver, for receiving broadcast FM radio RF signals, said tuner means selecting a particular broadcast FM radio RF signal from a plurality of broadcast FM radio RF signals in response to said first control signal, and for converting said particular broadcast FM radio RF signal to a first intermediate frequency;

control means for generating said first control signal for causing said tuner means to select one of said particular television RF signal and said particular broadcast FM radio RF signal;

a second frequency conversion stage of said double conversion broadcast FM radio signal receiver, said second frequency conversion stage receiving said broadcast FM radio signal at said first intermediate frequency and converting said broadcast FM radio signal at said first intermediate frequency to a second intermediate frequency; and means for demodulating audio signals from said signal at said second intermediate frequency;

said control means generating a second state of said second control signal for causing said tuner means to switch between said first and second modes of operation, and for causing said coupling means to decouple said signal at said output of said tuner means from said intermediate frequency amplifier means;

wherein said coupling means is a SAW filter preamplifier, and said SAW filter preamplifier includes means for disabling said SAW filter preamplifier in response to said second state of said second control signal;

wherein said means for disabling said SAW filter preamplifier comprises a first transistor having a main current path coupled between the input of said SAW filter preamplifier and a point of reference potential for attenuating said output signal of said tuner means at said input of said SAW filter preamplifier; and wherein said SAW filter preamplifier comprises a second transistor biased for amplifying signals applied to said SAW filter preamplifier, and said first transistor disables said second transistor by removing bias from said second transistor.

* * * * *

UNITED STATES PATENT AND TRADEMARK OFFICE
CERTIFICATE OF CORRECTION

PATENT NO. : 5,142,370

DATED : August 25, 1992

INVENTOR(S) : Leroy S. Wignot, et al.

It is certified that error appears in the above-identified patent and that said Letters Patent is hereby corrected as shown below:

On title page, under [56] References Cited, U.S. PATENT DOCUMENTS, that portion reading "4,970,087" should read -- 4,974,087 --;
and the following should be added:

```
4,575,761   3/86   Carlson, et al. .......... 358/191.1
4,352,111   9/82   Carlson, et al. .......... 343/860
4,088,959   5/78   Sumi ..................... 325/459
4,027,242   5/77   Yamanaka ................. 325/17
4,361,906  11/82   Sakamoto ................. 455/140
```

Under OTHER PUBLICATIONS, the following should be added:

SAMS Photofact Schematic for the Dumont Model RA-119A television receiver, circa 1952.
An article in Funk-Technik, Vol. 35, No. 6/1980, pp. 216-226.

Signed and Sealed this

Twenty-fourth Day of August, 1993

*Attest:*

BRUCE LEHMAN

*Attesting Officer*     *Commissioner of Patents and Trademarks*